(12) United States Patent
Gilmore et al.

(10) Patent No.: US 7,334,126 B1
(45) Date of Patent: Feb. 19, 2008

(54) METHOD AND APPARATUS FOR SECURE REMOTE ACCESS TO AN INTERNAL WEB SERVER

(75) Inventors: Christian A. Gilmore, Denville, NJ (US); David P. Kormann, Morristown, NJ (US); Aviel D. Rubin, West Caldwell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/495,799

(22) Filed: Feb. 1, 2000

Related U.S. Application Data (60) Provisional application No. 60/173,979, filed on Dec. 30, 1999.

(51) Int. Cl.
*G06F 17/30* (2006.01)
*G06F 15/16* (2006.01)

(52) U.S. Cl. ............ 713/168; 713/155; 713/169; 707/1; 707/10; 707/204

(58) Field of Classification Search ............ 713/151, 713/201, 152, 186, 182, 200; 709/227, 232, 709/229, 203; 707/1, 4, 10, 104.1; 717/102; 455/445; 705/51, 26, 39, 1; 370/401
See application file for complete search history.

(56) References Cited

U.S. PATENT DOCUMENTS

| | | | |
|---|---|---|---|
| 6,088,796 A * | 7/2000 | Cianfrocca et al. ......... 713/152 |
| 6,104,716 A * | 8/2000 | Crichton et al. ............ 713/201 |
| 6,256,631 B1 * | 7/2001 | Malcolm ...................... 707/10 |
| 6,334,056 B1 * | 12/2001 | Holmes et al. ............. 455/445 |
| 6,463,418 B1 * | 10/2002 | Todd ............................ 705/26 |
| 6,567,918 B1 * | 5/2003 | Flynn et al. .................. 726/7 |
| 6,578,078 B1 * | 6/2003 | Smith et al. ................ 709/224 |
| 6,754,831 B2 * | 6/2004 | Brownell ...................... 726/15 |
| 2002/0144128 A1 * | 10/2002 | Rahman et al. ............. 713/186 |
| 2002/0169980 A1 * | 11/2002 | Brownell ..................... 713/201 |

* cited by examiner

Primary Examiner—Tony Mahmoudi (57) ABSTRACT

The present invention provides authorized users access to sensitive information on internal servers inside a firewall while protecting the information from others. A strong client authentication mechanism is layered on top of a secure communication protocol to allow legitimate users access to an internal server from outside the firewall. A proxy is provided with an external component outside the firewall and an internal component inside the firewall, with a control communication channel established between the two. The external component forwards messages through the firewall to the internal component which handles user authentication and acts as a proxy between the user and the internal servers. Where the returned resource contains document hyperlinks, the links are translated into references to the proxy, permitting the user a seamless experience that is almost exactly the same whether the user is inside or outside the firewall.

19 Claims, 6 Drawing Sheets

464: DAN MAP FAIR CLAN HOVE BOO
465: TOP JAM CULT MOLT LAWN SEEN
466: SLID RODE JIG SLUG HUE COIN
467: SWAG IT AMES ELI WAST TIP
468: TIP SMOG EGAN MAP VIEW AJAR
469: EEL STAG SKIT AID DONE SLY
470: SKI APT BAND KIND BAD AD
471: BOB FREY HIDE FUSS GARY LAP
472: FIRE HUCK MIND DUE REEL KUDO
473: AGO AWRY WIT HAY BULK RAW
474: TIM KNOT KEY HASH FUM PAP
475: LYNN FIVE LILY JUG FARM AVON
476: COL COOT COLD FOOL NAGY MESH
477: NOON CHEN NAIL GAB SEEM GALA

```
SSL_RSA_WITH_RC4_128_MD5
SSL_RSA_WITH_RC4_128_SHA
SSL_RSA_WITH_IDEA_CBC_SHA
SSL_RSA_WITH_DES_CBC_SHA
SSL_RSA_WITH_3DES_EDE_CBC_SHA
SSL_DH_DSS_WITH_DES_CBC_SHA
SSL_DH_DSS_WITH_3DES_EDE_CBC_SHA
SSL_DH_RSA_WITH_DES_CBC_SHA
SSL_DH_RSA_WITH_3DES_EDE_CBC_SHA
SSL_DHE_DSS_WITH_DES_CBC_SHA
SSL_DHE_DSS_WITH_3DES_EDE_CBC_SHA
SSL_DHE_RSA_WITH_DES_CBC_SHA
SSL_DHE_RSA_WITH_3DES_EDE_CBC_SHA
```

*FIG. 7*

METHOD AND APPARATUS FOR SECURE REMOTE ACCESS TO AN INTERNAL WEB SERVER

CROSS REFERENCE TO RELATED APPLICATIONS

This application claims priority to Provisional Application Ser. No. 60/173,979, "Method and Apparatus for Secure Remote Access to an Internal Web Server," filed on Dec. 30, 1999, the content of which is incorporated by reference herein.

FIELD OF THE INVENTION

The present invention relates generally to communication networks, and, more particularly, to secure remote access to an internal server from outside a firewall.

BACKGROUND OF THE INVENTION

Most large organizations today have to resort to using firewalls to protect internal communication networks from would-be hostile attackers on public communication networks such as the Internet. The firewall, in accordance with a security policy, protects resources in the private network by filtering communications destined for internal machines. The conventional security policy usually amounts to total trust of all insiders and total mistrust of outsiders, where the firewall defines the boundary. This results in a significant inconvenience for insiders who travel outside of the firewall boundary, rendering it difficult to access important information that they left inside the firewall. While such users may have a legitimate right to access the internal servers, they may not be accessible to them.

Assuming the user does not have the equipment for remote dial-up access to a machine inside the firewall, an insider with access to only a public terminal has limited options. Most protected sites allow users limited telnet or ftp access to their machines from the outside so that they can at least read their e-mail and edit files. Usually, the users are authenticated through some strong one-time password mechanism in hardware or software. On the other hand, the resources of many internal servers on an intranet are only accessible via a text-based browser such as LYNX, with no support for multimedia, executable content, helper applications and other recent browser features. Even worse, since telnet connections are usually unencrypted, the web content travels to the remote site in the clear. Moreover, many public Internet kiosks (e.g. at the airport) which have HTML browsers have no access to telnet or other such Internet services. It is possible that Virtual Private Network (VPN) technology could be used to allow access to the internal network, but current products require significant investment in cost and resources. Moreover, it is unclear whether a VPN solution is feasible for providing internal access from sites such as terminal rooms at conferences and/or Internet cafes.

At the very least, there is a need for a more lightweight solution to providing remote access that is practical, easy to use, secure, and scalable—all while leaving the firewall and local infrastructure unchanged.

SUMMARY OF THE INVENTION

The present invention provides authorized users access to sensitive information on internal servers inside a firewall while protecting the information from others. A strong client authentication mechanism is layered on top of a secure communication protocol to allow legitimate users access to an internal server from outside the firewall. A proxy is provided with an external component outside the firewall and an internal component inside the firewall, with a control communication channel established between the two. The external component forwards messages through the firewall to the internal component which handles user authentication and acts as a proxy between the user and the internal servers. Where the returned resource contains document hyperlinks, the links are translated into references to the proxy, permitting the user a seamless experience that is almost exactly the same whether the user is inside or outside the firewall.

These and other advantages of the invention will be apparent to those of ordinary skill in the art by reference to the following detailed description and the accompanying drawings.

DETAILED DESCRIPTION

Figure 1:
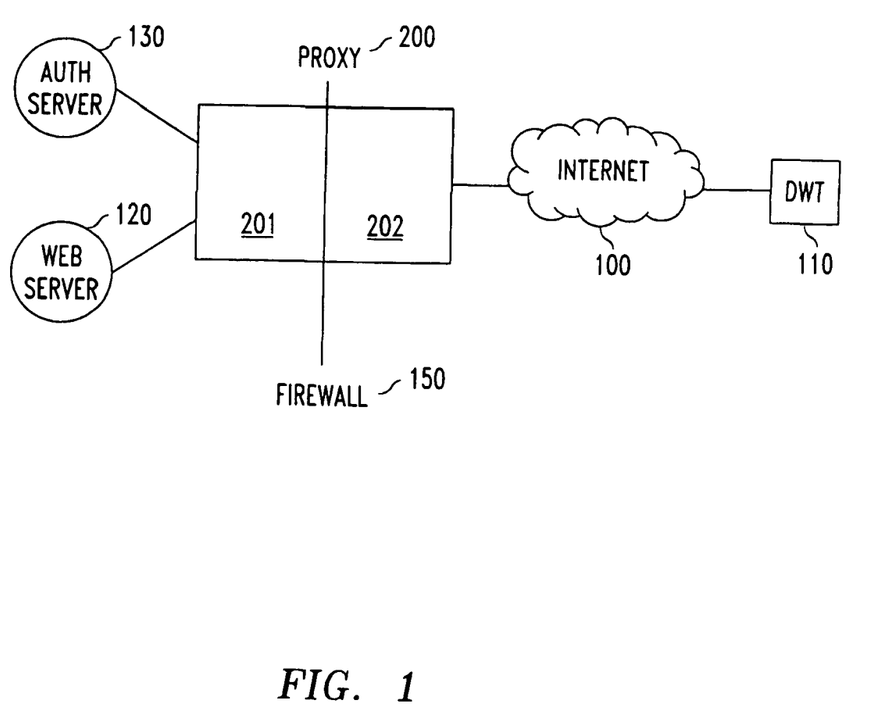
FIG. 1 is a diagram illustrating a preferred embodiment of the present invention.

FIG. 1 illustrates a preferred embodiment of the present invention. Client 110 is connected to a communication network 100—for example, and without limitation, a public data network such as the Internet. Client 110 can be any network-enabled terminal device such as, and without limitation, a personal computer running a browser program such as Netscape Navigator or Mosaic, a Web-enabled telephone or personal digital assistant, any dumb web terminal ("DWT"), etc. The user of client 110 is presumed to require access to an internal server 120 behind a firewall 150. Internal server 120 may, for example, be a conventional Web server providing confidential content to an intranet. Firewall 150, following conventional pre-defined policy settings for protecting internal networks, permits hosts behind the firewall to establish connections to hosts outside the firewall while inbound connections are tightly restricted.

It is assumed for purposes of the following detailed description that the client 110 is a World Wide Web client and that it communicates with servers using the Hypertext Transfer Protocol (HTTP). See R. Fielding et. al., "Hypertext Transfer Protocol —HTTP/1.1", RFC 2068, Network Working Group, 1997, which is incorporated by reference herein. Although the present invention is described with particular reference to HTTP and the Web, one of ordinary skill in the art would readily recognize that the invention is applicable to other communication protocols for transferring information between a server and a client (referred to herein generically as a "document serving protocol").

In order to prevent eavesdropping in the network 100, it is advantageous that the client 110 is enabled to use some form of secure communication protocol such as the Secure Sockets Layer (SSL). See A. Frier et al., "The SSL 3.0 Protocol," Netscape Communication Corp., 1996; T. Dierks et al., "The TLS Protocol," RFC 2246, Network Working Group, 1999, which are incorporated by reference herein. Client terminal 110 advantageously can otherwise be treated as "untrusted" (e.g. it can be a public terminal at an Internet café or at a hotel). In other words, the administrator of the terminal can be assumed to have complete control of all data coming and out of the machine. Although it must also be assumed that it is possible for any confidential content viewed on the terminal to be secretly recorded and copied by the site administrator, aspects of the present invention still do not allow the administrator of the terminal to access other sensitive content inside the firewall by virtue of such illicit observation.

In accordance with a preferred embodiment of the present invention, a proxy 200 is positioned with one sub-component of the proxy inside the firewall 201 and one on the outside 202. A user of the terminal 110 connects to the proxy 200 through the communication network 100 with an authentication request, described in further detail below. The proxy 200 consults some database, for example at an authentication server 130, to verify that the request is from a valid user. Once the authentication process is complete, requests from the user are forwarded to the internal part of the proxy 201 which proceeds to process the requests by contacting the internal server 120.

Figure 2:
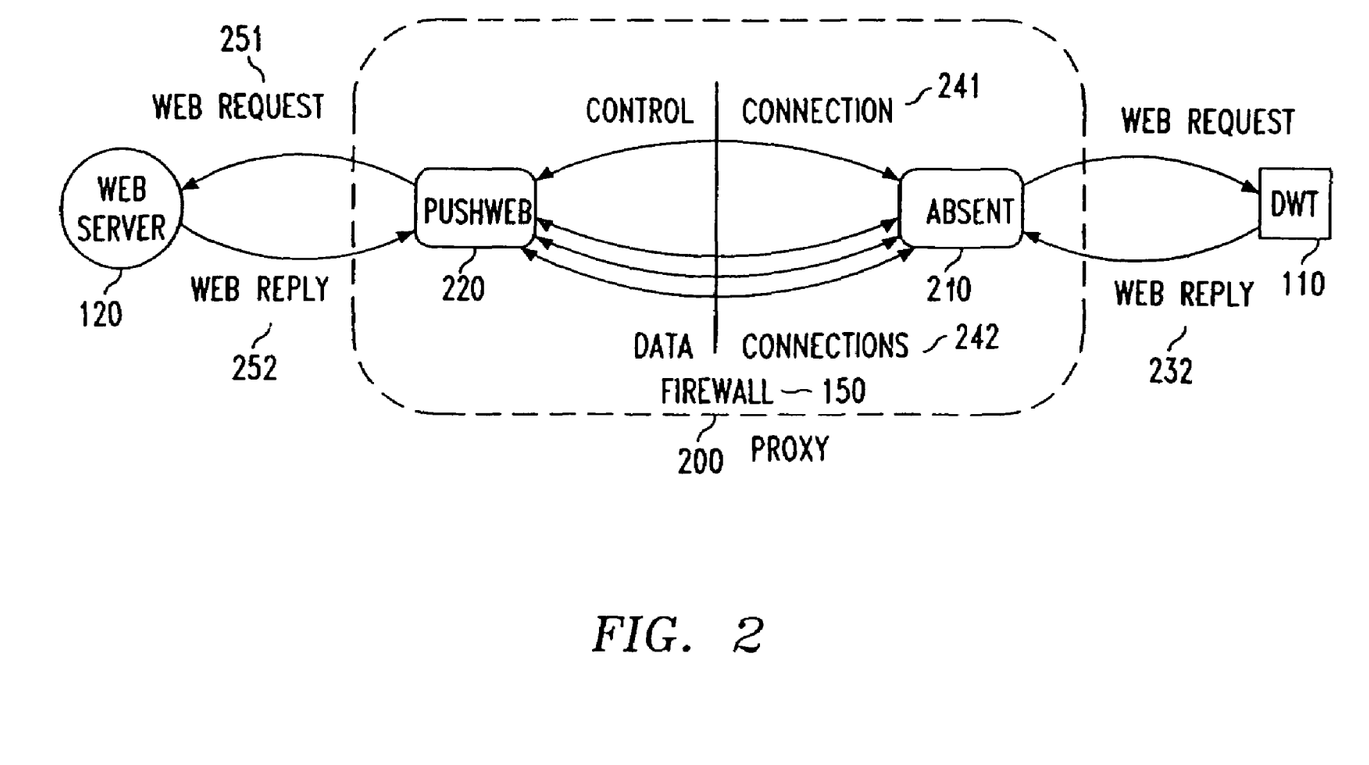
FIG. 2 is a diagram illustrating a proxy in accordance with a preferred embodiment of the present invention.

The proxy 200 can comprise multiple machines communicating across the firewall 150. An alternate preferred embodiment of the proxy 200 is shown in further detail in FIG. 2. With reference to FIG. 2, proxy 200 is a computer with a central processing unit executing computer program instructions stored in memory (not shown), the computer program instructions providing the functionality of the internal and external components of the proxy 200. The external and internal components are implemented as two daemons which the inventors have named "ABSENT" and "PUSHWEB", shown abstractly in FIG. 2 as 210 and 220 respectively. ABSENT 210 is a standalone blind proxy program that implements a control channel protocol described below to the PUSHWEB 220 server daemon. PUSHWEB 220 is a modified Web server that includes a handler for rewriting hyperlink addresses and a special authentication interface. For example, the inventors implemented PUSHWEB 220 by modifying a standard Apache web server to perform the following.

PUSHWEB 220 maintains a control connection 241 to ABSENT 210 using a simple control channel protocol. The control connection 241 is necessary because it is presumed that the firewall does not allow connections from ABSENT 210 to PUSHWEB 220. For example, the control channel protocol can consist of the following five messages:

| | |
|---|---|
| HELO(timestamp, mac) | Sent by PUSHWEB when opening the control channel. |
| COPEN(id, timestamp, client_sockaddr, mac) | Sent by ABSENT to PUSHWEB to indicate that a new data connection for the client should be opened. |
| COPEN_R(id, timestamp, mac) | Sent by PUSHWEB along a new data channel after a connection is opened. |
| PING(timestamp, mac) | Either side may send a PING message; |
| PONG(timestamp, mac) | the sending side expects to receive a PONG message within a reasonable period of time. If none is received, the control connection is assumed to be dead. |

The messages can be used as follows. The control channel is opened by PUSHWEB 220 at startup by sending the HELO message. ABSENT 210 checks that the timestamp is within a reasonable amount of time from the current time (to prevent replay attacks). ABSENT 210 and PUSHWEB 220 also utilize some form of message authentication mechanism to ensure that messages transferred between them have not been faked. For example, a secret key can be shared between the two daemons at installation time and a message authentication code (MAC) generated and associated over the arguments in each message. ABSENT 210 checks the MAC by re-computing it using the shared secret. If the MAC matches and the source of the connection is the configured address of PUSHWEB 220, the connection is assumed by ABSENT 210 to be valid. If not, the connection attempt is rejected.

An outside user, e.g. at terminal 110, can initiate the present service by requesting a connection to ABSENT 210. When terminal 110 is a web browser, this is conventionally accomplished by typing a hostname URL, e.g. "absent.research.att.com", into the browser. When ABSENT 210 receives a connection from the user browser, it records some information about the connection and sends a request along the control connection 241 using the COPEN message. The "client_sockaddr" argument in the COPEN message is a socket address indicating the site from which the client is connecting. The "id" argument is used by ABSENT 210 to identify the client; it has no meaning to PUSHWEB 220 and is essentially an opaque value which should simply be returned. The timestamp and MAC fields are checked by PUSHWEB 220 as in the HELO message, with the exception that the MAC covers all of the arguments to the control message. If an incorrect MAC is received, the control connection is immediately closed.

PUSHWEB 220 opens a data connection 242 to ABSENT 210 which will be used for proxied data between the client and PUSHWEB 220. The Web server code of PUSHWEB 220 has been modified to create the new connection 242 upon receipt of a COPEN message on the control channel 241. Once the socket address of this new connection is set using the "client_sockaddr" value supplied with the COPEN message, the connection appears to PUSHWEB 220 to be a normal client connection form the client address. This use of spoofing advantageously permits PUSHWEB to otherwise utilize standard Web access control and logging functions. PUSHWEB 220 then sends a COPEN_R message along the new data channel 242 and ABSENT 210 does the usual checks on timestamp and MAC. If the "id" value refers to a waiting connection, ABSENT 210 begins immediately acting as a proxy for the client. ABSENT 210 uses the data connection 242 to forward requests to PUSHWEB 220, which forwards the requests 251 to the internal web server 120. The internal server 120 processes the request 251 and returns a reply 252 to PUSHWEB 220, which processes the reply as further described in detail below. The reply is then forwarded to ABSENT 210, which sends the reply 232 back to the terminal 110 where it is displayed to the user.

Some firewall policies will time out inactive connections after a pre-determined period of time. To prevent this from interfering with the operation of PUSHWEB 220 and ABSENT 210, a simple keepalive protocol can be used. The PING and PONG messages set forth above implement such a protocol. Periodically, either side may send a PING message. The sending side expects to receive a PONG message within a reasonable period of time. If none is received, the control connection 241 is assumed to be dead. ABSENT 210 will then stop accepting new client connections until a new control connection 241 can be established (existing connections can continue to be serviced). Once PUSHWEB 220 becomes aware of the situation, it will attempt to reestablish the control connection 241, as described above.

The following sections describe in further detail the (1) authentication procedure, (2) hyperlink address translation, and (3) other security issues with regard to the preferred embodiment.

1. Authentication

Security is paramount when considering exporting internal information outside the firewall. It must be assured that only valid users can access the internal servers while active attackers on the communication network cannot. Accordingly, in a preferred embodiment of the present invention, an authentication scheme such as hash chaining is used to protect the system. See N. Haller et al., "A One-Time Password System," RFC 1938, Network Working Group, 1996, which is incorporated by reference herein. Commonly-used implementations of this standard are S/KEY and a freely distributable kit called One Time Passwords In Everything (OPIE). Although a one-time password authentication mechanism is described below as advantageous, other well-known forms of authentication can be utilized in the context of the present invention-such as personal identification numbers, authentication tokens, etc.

There are two phases to authentication using hash chaining: an initialization phase and an authentication phase. In the initialization phase, a user provides key information that is stored in a database, e.g. at the authentication server 130. The user specifies the number of one-time passwords, n, and a secret passphrase, pw. A cryptographically strong one-way hash function f, e.g. MD5, is used to compute $y=f^n(pw)$ which is stored along with n and other useful information about the user. At this point, the user is initialized to use the system.

The initialized user can then go to any terminal 110, authenticate, and access the internal server 120. Using hash chaining, the user during the authentication phase sends $y'=f^i(pw)$, where i is initially n−1, to the authentication server 130. The server 130 checks to see if $y=f(y')$. If so, authentication is successful; otherwise it fails. If successful, the authentication server replaces y with y', the user decrements i by 1, and the process continues.

Figure 3:
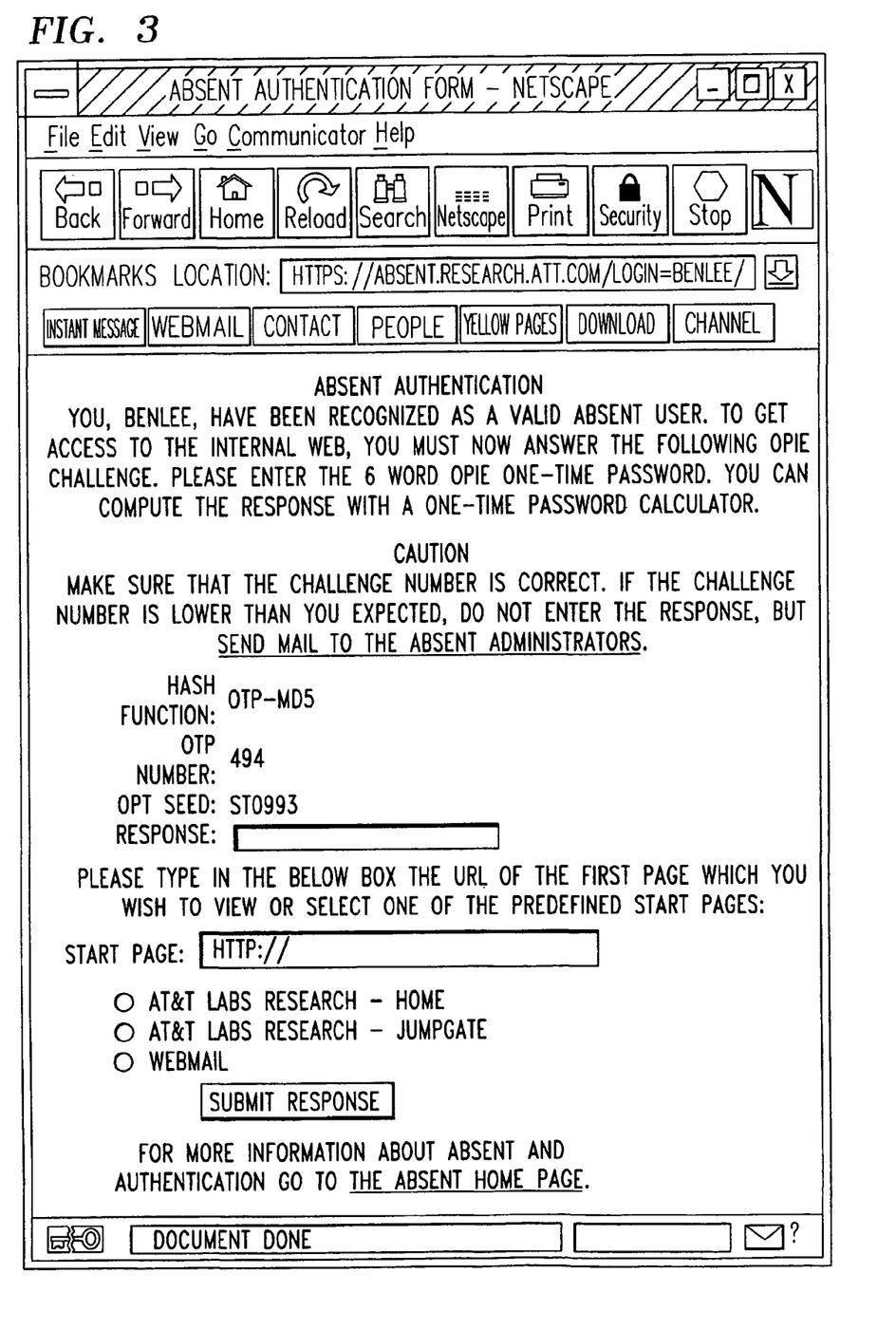
FIG. 3 is a screenshot of an example challenge form displayed on a browser.

FIGS. 3 through 6 illustrate an embodiment of an authentication process using OPIE. The user first issues a login request, e.g. by typing the following special URL:

"https://" followed by the string "absent.research.att.com/login=user"

ABSENT 210 forwards the request to PUSHWEB 220 which recognizes "login" as a special command code to begin the authentication procedure. PUSHWEB 220 negotiates a secure connection (e.g. using SSL) with the terminal 110, while ABSENT 210 blindly forwards data packets between them. ABSENT 210 essentially acts as a wire. This is similar to SSL tunneling; however, here packets are simply being forwarded without using the SSL tunneling protocol. This advantageously avoids having the user access the proxy settings of a browser on the terminal. Once the secure connection is established, PUSHWEB 220 looks up the user in a database. If the user is registered, PUSHWEB 220 submits a request to the authentication server 130 which generates an authentication challenge. PUSHWEB 220 then constructs an HTML page with a form for the user to enter a response to the authentication challenge and send the document over the secure connection to the terminal 110.

Figure 4:
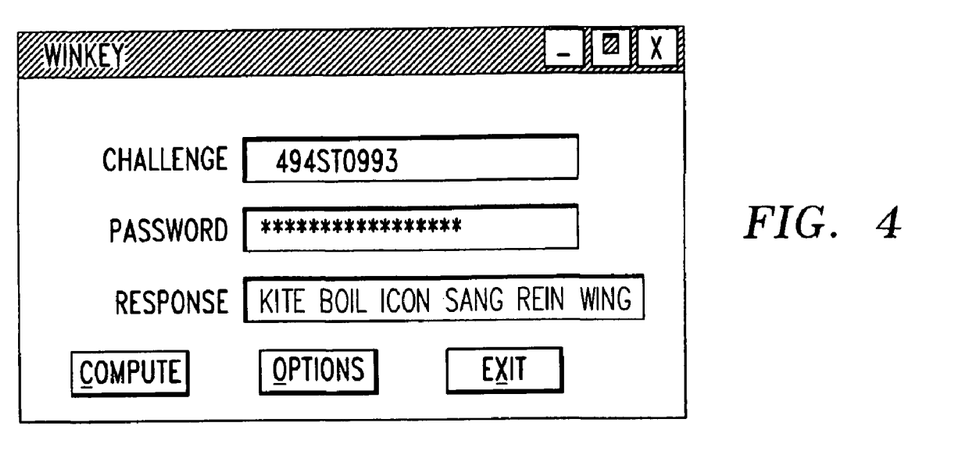
FIG. 4 is a screenshot of an example one-time password calculator.
Figure 5:
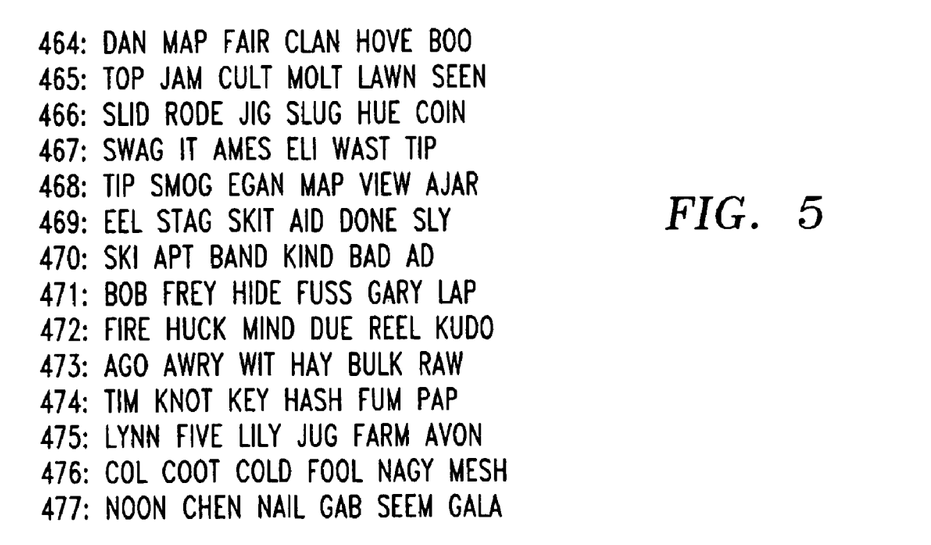
FIG. 5 is a sample list of one-time passwords.

FIG. 3 shows an example of a challenge page using OPIE. An OPIE challenge is of the form:

otp-md5 494 st0993 ext where otp-md5 indicates that MD5 is the hash function, 494 is the number of times to iterate the function, and st0993 is the seed for the generator. A list of one-time passwords (e.g. see FIG. 5) can be printed on paper in advance or computed using a calculator. FIG. 4 illustrates a Windows-based OPIE calculator program. The user enters the seed, the number of times to iterate and the secret passphrase into the OPIE calculator which then computes and provides the one-time password. The user types the one-time password into the HTML form in FIG. 3, chooses a starting internal server document, and clicks the submit button. The form constructs a response from this information using a special code, "OTP_response" that will be recognized by PUSHWEB 220. For example, the response can be in the form:

"https://" followed by the string

"absent.research.att.com/OTP_response=user/? response=RESPONSE&startpage=URL" PUSHWEB 220 sends the response to the authentication server 130. If the authentication succeeds, then an entry is created in a user table and the page requested in the challenge form is returned to the user, e.g. FIG. 6. For security reasons, one of the fields in the user table entry can be an expiration time, which can be set to a value such as 20 minutes. After 20 minutes of usage has elapsed, the user is presented with another challenge page.

Figure 7:
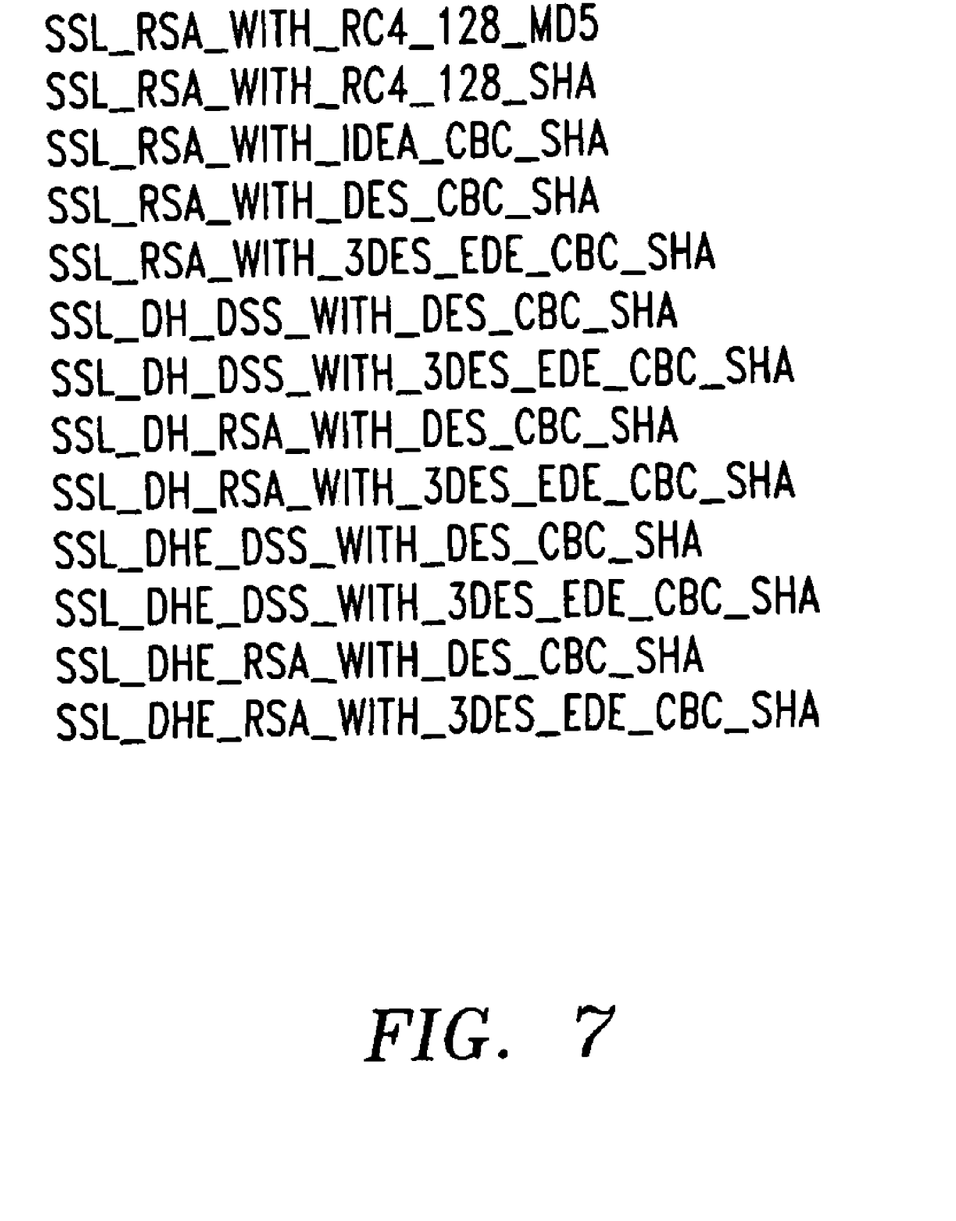
FIG. 7 is a list of SSL ciphersuites that may be used by PUSHWEB.

If a one-time password challenge and response mechanism is used, it is important that it occur over a secure connection, such as an SSL connection. FIG. 7 sets forth a list of SSL ciphersuites that may be advantageously used by PUSHWEB. One-time password systems such as OPIE and S/KEY have been shown to be vulnerable to active attacks. The confidentiality and replay prevention properties of SSL ensure that a play-in-the-middle attack (e.g. where the response from the user is blocked and then later used by the intruder) is not possible. It is also important that users check the security information about their SSL connection to ensure that they are communicating with PUSHWEB. Otherwise, an imposter could substitute some other valid server certificate and elicit OPIE passwords from the user, or feed the user bogus content. Most browsers are configured to warn the user if the name in a certificate does not match the site requested. Thus, the certificate for PUSHWEB in the example above actually contains the name "absent.research.att.com" so that the browser will not complain that the name of the server and the name in the certificate do not match (the private key corresponding to the public key in the certificate should be kept only on PUSHWEB).

2. Hyperlink Address Translation

Figure 6:
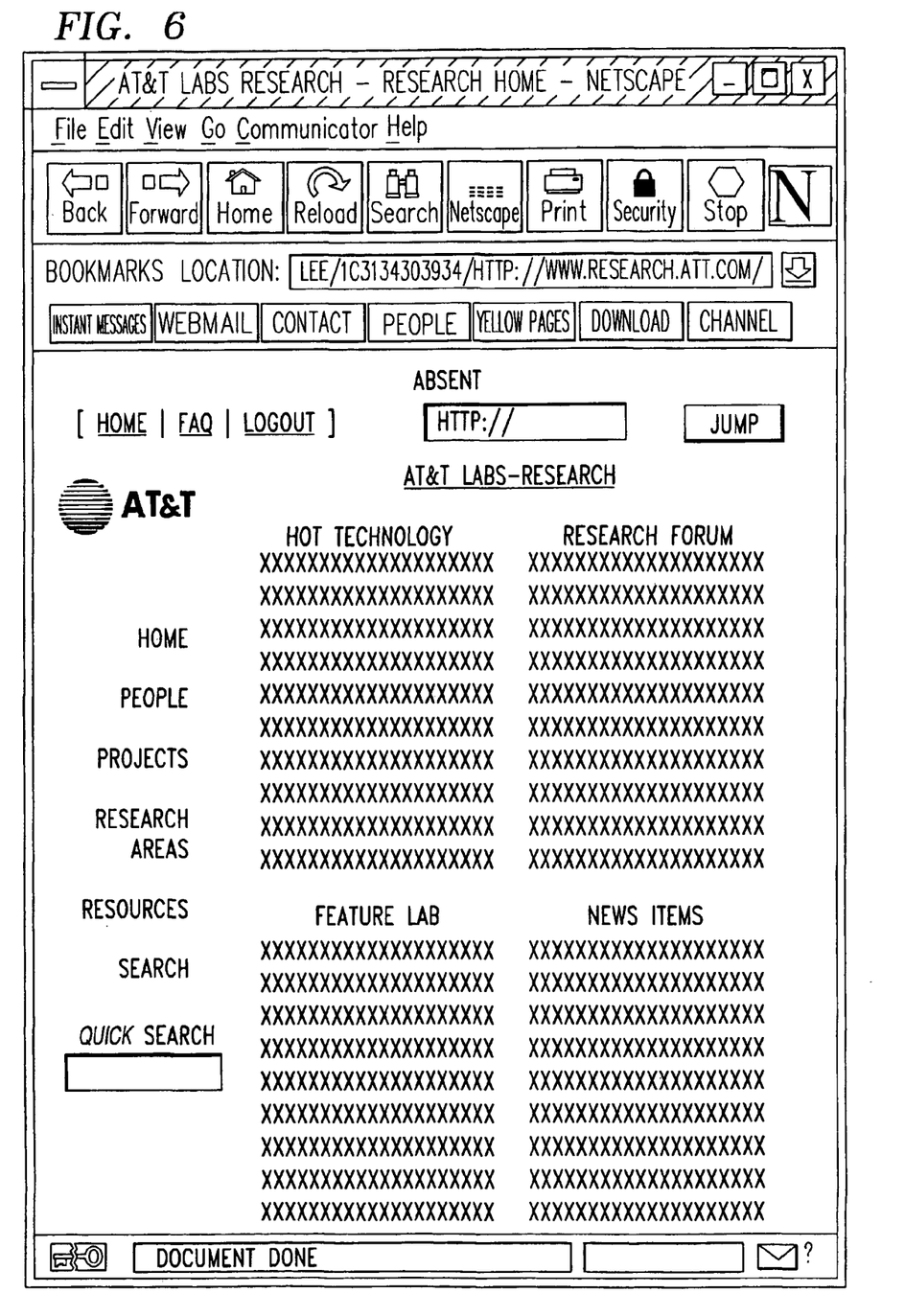
FIG. 6 is a screenshot of an example document from an internal server displayed on a browser.

FIG. 6 sets forth an example of an internal server HTML document returned by PUSHWEB 220 to the user of the terminal 110. Web pages such as the one shown in FIG. 6 may contain hyperlinks to other pages behind the firewall. Resource addresses in links (and otherwise) are conventionally expressed as Uniform Resource Locators (URLs), the format of which is described in Berners-Lee, T., et al., "Uniform Resource Locators," RFC 1738, Network Working Group, 1994, which is incorporated herein by reference. If the links are not changed by the system, then future requests will not be able to access internal pages without re-authentication. For example, a link in an HTML document may be of the form:

a href="http://myhost.research.att.com/proprietary.html">Business Plan</a enclosed by < >.

When the user clicks on "Business Plan", the terminal will attempt to connect directly to machine "myhost" and, of course, the firewall will not allow this.

To solve this, the document should be processed before it is passed along to the user. In accordance with a preferred embodiment of the present invention, new resource addresses are constructed that point to the proxy 200 and which include the original resource address and security information, which is described in further detail below. The goal is to make the browsing experience the same as when users are behind the firewall. The rewritten pages appear the same to users, but when the hyperlinks are clicked on, the pages are requested through the proxy. The only difference users might notice are the URL that is displayed in the location window (e.g. see FIG. 6) and the appearance of codified URLs in the message window of a browser when the mouse passes over links.

An advantageous format for rewriting a URL could include the following information: (a) the proxy URL (e.g. https://absent.research.att.com) which points user terminals to the relevant proxy address and port; (b) a command, e.g., "cmd=user" where "cmd" indicates the action to be taken by PUSHWEB ("geturl", "login", "logout", "OTP_Response") and "user" is an account identification for the user); (c) security data, further described in detail below; and (d) the original URL that was contained in the page, converted to an absolute URL where necessary. As an example, the URL "http://" followed by the string "www.research.att.com/projects"

can be rewritten as

"https://" followed by the string

"absent.research.att.com/geturl=user/2b5 db86c1f6e/http://www.research.att.com/projects/" Accordingly, PUSHWEB 220 checks whether content it is retrieving from internal server 120 might contain hyperlinks (e.g. by checking if "Content-type" of the response from the server is "text/html"). If so, the document is parsed to identify all links on the page (if not, then the response from the server can remain unedited.). Each link containing a relative URL is converted to one containing an absolute URL (e.g. by adding the "http://" protocol, adding the complete server name such as "music.research.att.com", and/or appending the proper path information such as "/dir/foo.html" rather than "../foo.html"). URLs that are outside of the trusted domain are not changed further. However, URLs that are behind the firewall are reconstructed in the above format to prepend the relevant information needed for processing.

A header can be added to the document (shown in FIG. 6) to provide a convenient logout button and to provide a field where internal URLs can be directly entered without resorting to hyperlinks. URLs there entered (unlike URLs entered directly into the browser location field) are automatically transformed by the system, in the same manner as the hyperlinks, before processing by the proxy. The "Content-length" header of the HTML document should be adjusted to match the new larger document length.

It is advantageous as a matter of security to bind every URL to an authenticated user. Accordingly, in a preferred embodiment of the present invention, security information is included in the URL (e.g. "2b5 db86c1 f6e" in the above URL). The first two characters ("2b") correspond to the hexadecimal representation of the length in bytes of the original URL. The remaining data ("5 db86c1f6e") represents the output of a MAC function, truncated to the 40 most significant bits. As described above, when a user is authenticated, an entry is created in a user table by PUSHWEB. A random key can be generated for the user and added to the table. The key can be used to compute the MAC. Truncating the MAC makes it more difficult for an attacker to exhaustively search for the key because there are many possible keys that could produce the shortened output. In choosing a bit length (the inventors chose 40), there is a tradeoff in the amount of work required for an attacker to exhaustively generate a valid MAC versus the length of the URLs (it should be kept in mind that most systems limit URL length to 256 bytes). When PUSHWEB receives a URL, it first checks that the user is valid (i.e. registered with the system). It then checks that the length of the URL is correct. Finally, it receives the key from the user table, computes the MAC, and compares the most significant 40 bits to the MAC. If all of these tests are correct, then the page is retrieved. If the key has expired, the server sends a new one-time password authentication form. This results in a new MAC key for the user after successful authentication. Thus, old URLs with MACs from expired keys are useless.

When a user submits information to the server in a form using a GET method, a URL containing the names and values of the input boxes is passed from the terminal to the server. This URL cannot be MACed in advance by PUSHWEB because there is no way to know what values the user will enter. For example, say that a CGI script is referenced by the following URL (where "absent" represents "absent.research.att.com"):

"http://" followed by the string

"absent/geturl=alice/32a5d386cf6e/http://www.research.att.com/~alice/cgi-bin/reg.cgi"

The URL sent to the server when the user submits could be "http://" followed by the string "absent/geturl=alice/32a5d386cf6e/http://www.research.att.com/~alice/cgi-bin/reg.cgi&name=bob".

The MAC is correct for the first 50 bytes of the original URL, but it does not include "&name=bob". Therefore, it is advantageous to include, in hex, the original URL that references the CGI script. In the above example, the length would be 50, which is hex 32. The most significant 40 bits of the actual MAC are 0xa5d386cf6e. The effect is that authenticated users can execute CGI scripts as long as their keys are valid. A CGI script that is MACed by an expired key cannot be invoked. A potential danger is that an attacker who can surmise that a particular request is a CGI form can replay the message to cause the script to execute again with the same input data as before. Fortunately, SSL protects against reply attacks, so the present system is not vulnerable to this.

It should be kept in mind that the security of any system that uses cryptographic operations lies in the unpredictability of the keys. As described above, the system requires the generation of a secret key corresponding to each user to compute the MACs of URLs. In a preferred embodiment of the present invention, an expensive function is used to generate as random a seed as possible, followed by a speedy operation to generate user keys from the initial randomness. For example, a slow but truly random number generator like the randlib package from CrytoLib can be utilized upon server startup to generate a master key, and DES used as a pseudorandom function with the master key as the key to generate all other MAC keys. After generating the master secret, a counter can be initialized. Then, every time a new key is needed, a computation is made of new-key=DES (master-key, counter) and then the counter incremented.

This has the advantage of quickly computing new keys while making cracking these keys without knowledge of the master key difficult.

3. Security Assessment

The security of the present system rests on the security of the underlying mechanisms and their composition. ABSENT should be constantly and carefully monitored. The machine is outside the firewall, and it is reasonable to assume that it will come under attack. Assuming that a sophisticated attacker manages to become root on ABSENT, the attacker could attempt any one of the following: (a) denial of service, preventing valid users from being able to use the system; (b) passively eavesdropping on a user's session, attempting to see the contents of a user's interaction with the internal web server without diverting the SSL protocol; (c) serve bogus information to a user, masquerading as the internal web server and serving up fictitious information to the user; (d) obtain valid one-time passwords, fooling the user into exposing a one-time password with a lower number than any previously used; (e) access the internal web, bypassing authentication mechanisms and access protected content on the internal web; (f) obtain root on PUSHWEB; and/or (g) compromise the internal network including control over machines and files.

The first attack, denial of service, is not preventable as an attacker who controls ABSENT can easily close all sockets on the machine and refuse to communicate with anyone. Nevertheless, it is easy to detect such attacks, and the machine should be monitored for this condition. The second attack is more difficult for the attacker. ABSENT serves only as an SSL proxy. It blindly forwards SSL data between PUSHWEB and the client. There are no encryption/decryption keys stored on ABSENT. Therefore, there is no way that the attacker can eavesdrop on a session without breaking SSL or performing a more active attack. To serve bogus information to the user, the attacker must establish an SSL connection with the browser. To do this, it must serve a valid certificate; such certificates are not too difficult to obtain. If such an attack is successful, the server could fool the user into revealing secret one-time passwords. The only way to prevent this attack is to require users to check the security information in the certificate when they use the system and to verify that the name of the server in the certificate is correct.

Without compromising PUSHWEB, the internal server, SSL, or one-time passwords, there is no way to use access to ABSENT to get to the internal web server. This is because the only messages coming from ABSENT to PUSHWEB are control messages instructing PUSHWEB to open data connections. These connections are used to forward SSL traffic. An attacker on ABSENT can exhaust resources on PUSHWEB, but that is the extent of the damage possible. Similarly, barring buffer overflow attacks and other such vulnerabilities related to bugs in the software, there is no way to use root access on ABSENT to break into PUSHWEB or the internal network more easily than from an arbitrary host on the Internet.

Because PUSHWEB runs behind the firewall, a root compromise can be devastating. Besides compromising all access control on web content, an attacker could launch attacks on the internal file system and on user accounts. To compromise this machine, an attacker needs to exploit vulnerabilities in the PUSHWEB code or existing weaknesses in the firewall. Accordingly, memory allocation in PUSHWEB must be coded very carefully to avoid buffer overflow problems, the leading cause of software security flaws. Other special precautions can be taken with regard to PUSHWEB. First, the PUSHWEB server should be run under a limited user account, which has permission only to read and write files needed for the service. No other services should be made available from PUSHWEB. No other regular user accounts should be available on PUSHWEB, other than administrative accounts to manage the service. All important actions and especially error conditions should be logged, and the logs monitored closely, preferably to some form of durable storage like a WORM (write once-read many) disk. Finally, all machines except the internal web server should be configured to refuse connections from PUSHWEB. These precautions make it difficult for an attack on PUSHWEB to lead to further compromise of the internal network. The logs are crucial to penetration detection and recovery.

For maximum security, it is also important that users clear the memory and disk cache and then kill the browser after usage. The HTTP directive "Cache-Control: no-cache" can be automatically included by PUSHWEB in every page, having the effect of forcing the browser into not adding the pages to the cache. The method, however, is not fool-proof, as users can still save pages they are viewing onto the remote machine, but there is a limit to how much the system can protect information from users who are determined to expose it.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description is described primarily with respect to HTTP, SSL, and other Internet standards. However, the principles of the present invention could be extended to other communication network protocols. Such an extension could be readily implemented by one of ordinary skill in the art given the above disclosure.

What is claimed is:

1. A method of providing access to a server in an arrangement that includes at least one device that serves as a firewall having a protected side and an unprotected side, a first proxy adapted to allow clients on the unprotected side of the firewall to gain direct access thereto, and a second proxy adapted to allow said server, on the protected side of the firewall, to gain direct access thereto and to not allow said clients direct access thereto comprising the steps of:
   receiving at the first proxy a connection request from a client of said clients;
   sending said connection request to the second proxy through said firewall, over a control channel previously established by a second proxy and controlled by the second proxy;
   authenticating the client;
   when the client is authenticated, said second proxy establishing a data connection with said first proxy, through said firewall, with the data connection adapted to forward requests of said client to said second proxy, where the data connection is distinct from the control channel.

2. The method of claim 1 further comprising the step of receiving a requested resource at the second proxy from the server and using the established data connection between the second proxy and the first proxy to forward the requested resource to the client.

3. The method of claim 2 wherein the resource is a document containing hyperlinks to other resources.

4. The method of claim 3 wherein the second proxy translates the hyperlinks in the document into references directed to and interpreted by the second proxy.

5. The method of claim 3 wherein the document is a Web page.

6. The method of claim 1 wherein the data connection uses a secure communication protocol.

7. The method of claim 6 wherein the secure communication protocol is SSL.

8. The method of claim 1 wherein the client is a browser and the server is a Web server.

9. The method of claim 1 wherein the client is authenticated using a password mechanism.

10. The method of claim 9 wherein the client is authenticated using a one-time password mechanism.

11. The method of claim 1 further comprising the step of receiving at said second proxy, in response to a request for a resource from said second proxy, said requested resource from the server inside the firewall and using the established connection between the second proxy and the client to forward the requested resource to the client.

12. The method of claim 1 further comprising the step of receiving from said first proxy, at said second proxy, a request for a resource of the server.

13. The method of claim 1 wherein said connection request comprises a URL, the method further comprising said second proxy executing the steps of translating said URL to a URL that corresponds to a URL of a server inside said firewall; and establishing a connection with said URL.

14. The method of claim 1 wherein the client is authenticated via said control channel using a password mechanism.

15. The method of claim 1 wherein said control channel is maintained by sending a command that requests a response, over said control channel, at intervals that insure a silence period of not more than a preselected value.

16. The method of claim 1 wherein said control channel is adapted to carry a limited number of different messages.

17. The method of claim 1 wherein said control channel is adapted to carry messages from a set that consists of a message sent by said second proxy to establish said control channel, a message sent by said first proxy to request establishment of said data connection, a hailing message that expects a reply, and a reply message that acknowledges said hailing message.

18. The method of claim 1 said step of establishing said data connection is followed by a step of said second proxy, sending a message to said first proxy, over said data connection, to inform said first proxy of the establishment of said data connection.

19. The method of claim 1 wherein said control channel is maintained by periodically one of the proxies sending a command that requests a response from the other of said proxies.

* * * * *